United States Patent [19]
Abe et al.

[11] Patent Number: 6,018,802
[45] Date of Patent: Jan. 25, 2000

[54] COMMUNICATION APPARATUS HAVING POWER BACKUP FUNCTION FOR IMAGE MEMORY

[75] Inventors: Koichi Abe, Tanashi; Yuji Kurosawa, Tokyo, both of Japan

[73] Assignee: Canon Kabushiki Kaisha, Tokyo, Japan

[21] Appl. No.: 08/804,757

[22] Filed: Feb. 24, 1997

Related U.S. Application Data

[63] Continuation of application No. 08/297,765, Aug. 30, 1994, abandoned.

[30] Foreign Application Priority Data

Aug. 31, 1993 [JP] Japan .................................. 5-215775

[51] Int. Cl.[7] ...................................................... G06F 1/26
[52] U.S. Cl. ............................................ 713/300; 365/229
[58] Field of Search ......................... 395/750.01–750.08, 395/183.12; 365/229; 710/300

[56] References Cited

U.S. PATENT DOCUMENTS

| | | | |
|---|---|---|---|
| 4,203,153 | 5/1980 | Boyd | 395/750.01 |
| 4,647,721 | 3/1987 | Busam et al. | 379/102 |
| 4,994,941 | 2/1991 | Wen | 362/26 |
| 5,194,968 | 3/1993 | Nakajima et al. | 358/438 |
| 5,230,074 | 7/1993 | Canova, Jr. et al. | 395/750 |
| 5,239,495 | 8/1993 | Nanno et al. | 364/707 |
| 5,276,865 | 1/1994 | Thorpe | 395/575 |
| 5,300,874 | 4/1994 | Shimamoto et al. | 320/15 |
| 5,317,752 | 5/1994 | Jewett et al. | 395/750.01 |
| 5,396,637 | 3/1995 | Harwell et al. | 395/750.01 |
| 5,432,946 | 7/1995 | Allard et al. | 395/750 |
| 5,504,673 | 4/1996 | Okamoto et al. | 364/187 |
| 5,514,946 | 5/1996 | Lin et al. | 320/31 |
| 5,590,343 | 12/1996 | Bolan et al. | 395/750.01 |

*Primary Examiner*—Glenn A. Auve
*Assistant Examiner*—David A. Wiley
*Attorney, Agent, or Firm*—Fitzpatrick, Cella, Harper & Scinto

[57] ABSTRACT

A communication apparatus comprises a main power supply for supplying a power to respective units of the apparatus, a central control unit powered from said main power supply for controlling the entire apparatus, a rewritable data memory unit, a main power supply control unit for controlling an operation of said main power supply, a secondary battery charged by said main power supply for supplying a power to said main power supply control unit and said memory unit, and a unit for supplying the power from said secondary battery to said memory unit during the stop of said main power supply and supplying the power from said main power supply to said memory unit during the operation of said main power supply.

91 Claims, 8 Drawing Sheets

COMMUNICATION APPARATUS HAVING POWER BACKUP FUNCTION FOR IMAGE MEMORY

This application is a continuation of application Ser. No. 08/297,765 filed Aug. 30, 1994, which is now abandoned.

BACKGROUND OF THE INVENTION

1. Field of the Invention

The present invention relates to a communication apparatus having an automatic receiving function and a backup function of an image memory.

2. Related Background Art

In a prior art facsimile apparatus, a main power supply comprising a switching power supply is provided, and all systems of the main power supply are normally activated or limited systems are activated for stand-by. A primary circuit of the main power supply may be directly controlled by a call signal from a telephone line to save power consumption.

On the other hand, in the prior art facsimile apparatus, for back-up of a received image in case of power failure, a secondary battery is provided separately from the main power supply to supply power in case of power failure so that a controlling CPU and data retaining DRAM are activated by the secondary battery.

However, in the prior art facsimile apparatus having the switching power supply, the following problems are encountered because it always supplies power to a secondary circuit by the oscillation of the primary circuit of the main power supply.

(1) Power of approximately 10 watts is consumed in the stand-by mode. This power is consumed all day long for the automatic receiving function and the loss of power is very great.

(2) Radiation noise is generated because of (1), which may adversely affect other electronic equipment.

(3) It is practically difficult to directly control the primary circuit of the main power supply by a plurality of means because of severe safety regulation.

Further, the following problems are encountered in connection with the backup of the memory.

(4) Dedicated secondary backup battery and charging circuit for the secondary battery must be provided.

(5) The circuit board size increases because of (4).

(6) A considerable capacity of secondary battery is required to activate the CPU by the secondary battery and the time available for backup is short.

(7) The cost increases because of (4), (5) and (6).

SUMMARY OF THE INVENTION

It is an object of the present invention to improve a communication apparatus.

It is another object of the present invention to provide a facsimile apparatus which has a small loss of power, prevents the generation of radiation noise, has no restriction regarding the safety regulation, has a small number of components for memory backup, can reduce board size circuit board, is less expensive, and provides a longer time available for backup.

The present invention comprises a main power supply for supplying a power to respective units of the apparatus, a main power supply control unit for controlling the main power supply, a secondary battery or solar cell for supplying a power to the main power supply control unit, and a memory unit for storing data. The main power supply is activated by a call signal from a telephone line or an ON signal from external switching means so that the power consumption in the stand-by mode is made substantially 0 watts without generation of radiation noise and restriction by the safety regulation, and a received image may be backed up in case of power failure. Thus, an extra circuit for the backup is eliminated and a cost is substantially reduced.

Other objects of the present invention will be apparent from the following description of the preferred embodiments and the drawings.

DETAILED DESCRIPTION OF THE PREFERRED EMBODIMENTS

Figure 1:
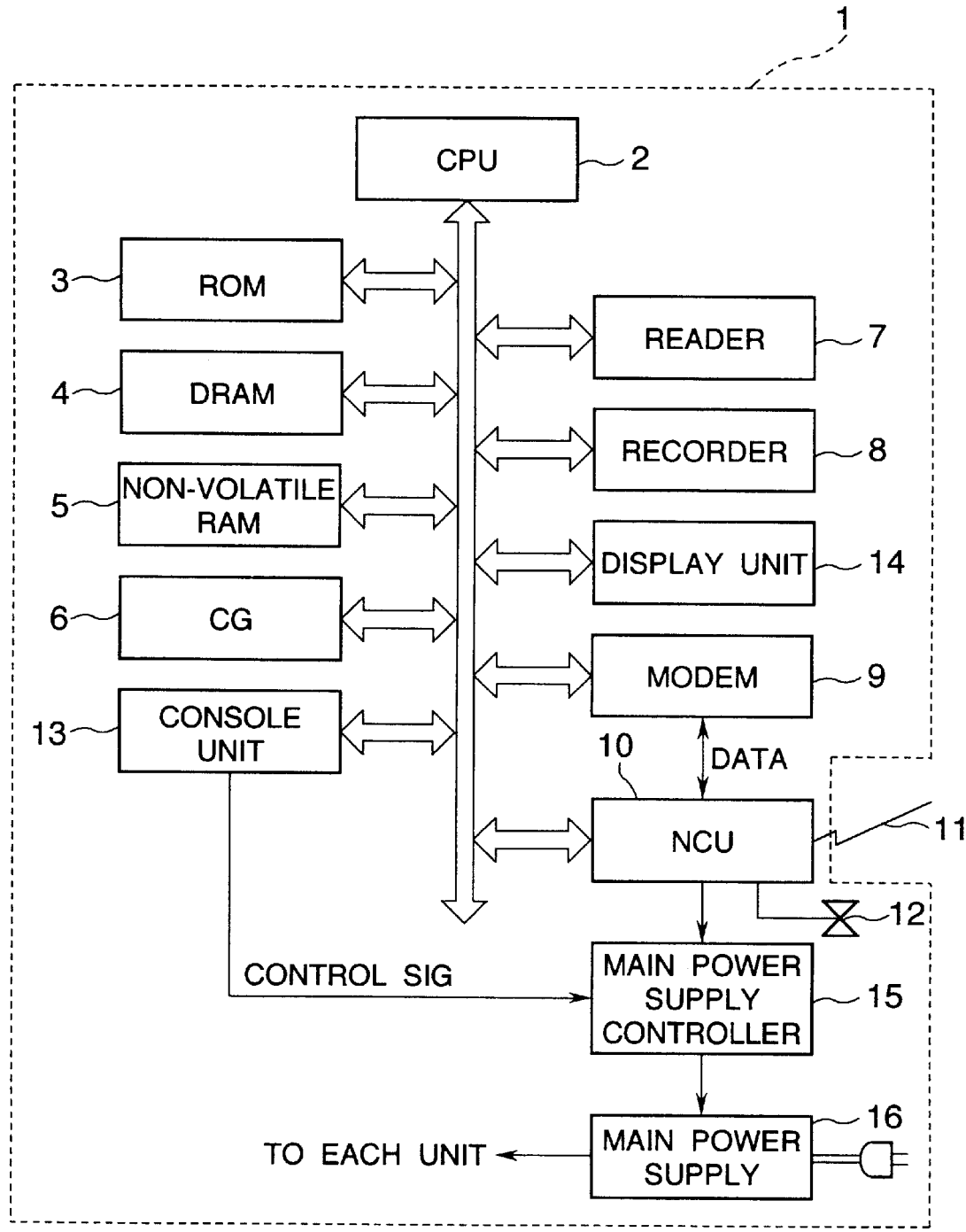
FIG. 1 shows a block diagram of a configuration of one embodiment of the present invention.

FIG. 1 shows a block diagram of a configuration of one embodiment of the present invention. In FIG. 1, numeral 1 denotes a main body of a facsimile apparatus, and numeral 2 denotes a CPU (central processing unit) comprising a microprocessor and it controls an entire system of the apparatus in accordance with a program stored in a ROM 3 and also controls a data readable and writable DRAM (memory unit) 4, a non-volatile RAM 5, a character generator (CG) 6, a document sheet reader 7, a recorder 8, a modem 9, a network control unit (NCU) 10, a console unit 13 and a display device 14.

The DRAM 4 has a self-refreshing function. When it enters into a self-refreshing mode by an external signal, it refreshes by itself without being supplied with an external control signal so long as a power is supplied to retain the stored data. The DRAM 4 stores binary data read by the reader 7 or binary data stored by the recorder 8 and stores binary data of a signal modulated by the modem 9 and outputted to a telephone line 11 through the network control unit 10. The DRAM 4 also stores binary data of an analog waveform inputted from the telephone line 11 and demodulated by the network control unit 10 and the modem 9.

The non-volatile RAM 5 stores data which is to be retained in the power-off state of the apparatus 1 such as abbreviation dial numbers. The ROM 3 stores characters such as JIS codes or ASCII codes, and character data for a predetermined code is read in two-byte data as required under the control of the CPU 2.

The reader 7 comprises a DMA controller, an image processing IC, an image sensor and a CMOS logic IC, and it binarizes the data read by a contact sensor (CS) under the control of the CPU 2 and sequentially sends the binary data to the DRAM 4. A set condition of a document sheet to the reader 7 is detected by a mechanical document sheet sensor mounted on a feed path of the document sheet, and a document sheet detection signal is applied to the main power supply control unit 15 and the CPU 2. The recorder 8 comprises a DMA controller, an ink jet recorder and a CMOS logic IC, and reads record data stored in the DRAM 4 under the control of the CPU 2 and outputs it as a hard copy. The modem 9 comprises a G3/G2 modem and a clock generator connected to the modem, and it modulates the transmission data stored in the DRAM 4 under the control of the CPU 2 and outputs it to the telephone line 11 through the network control unit 10. The modem 9 also receives the analog signal of the telephone line 11 through the network control unit 10 and stores the binary data of the modulated signal in the DRAM 4.

The network control unit 10 selectively connects the telephone line 11 to the modem 9 or the telephone set 12 under the control of the CPU 2. The network control unit 10 has detection means for detecting a call signal (CI), and when it detects the call signal, it sends a reception signal to the main power supply control unit 15 and the CPU 2.

The telephone set 12 is integrated with the apparatus main body and comprises a hand set, a speech network, a dialer and a ten-key and one-touch keys. The console unit 13 comprises a start key to start image transmission and reception, a mode selection key for selecting an operation mode in the transmission reception mode such as "Fine", "Normal" and "Auto receive", and a dialing ten-key or one-touch key. When those keys are depressed, an ON signal is applied to the main power supply control unit 15 and the CPU 2.

The display device 14 has a liquid crystal display for displaying 16 digits and displays predetermined characters under the control of the CPU 2. The main power supply control unit 15 controls the energization (power supply) to the respective units (blocks) of the apparatus 1 and comprises a one-chip microcomputer and a capacitor type secondary battery to be described later so that it can supply power from the secondary battery. When the main power supply control unit 15 receives the document sheet detection signal from the reader 7, the reception signal from the network control unit 10 or the ON signal from the console unit 13, it outputs start signal to start the main power supply 16. The main power supply 16 comprises an AC operated switching power supply which may be turned on and off by an external signal. It supplies a power and stops the power supply by the start signal and stop signal from the main power supply control unit 15.

Figure 2:
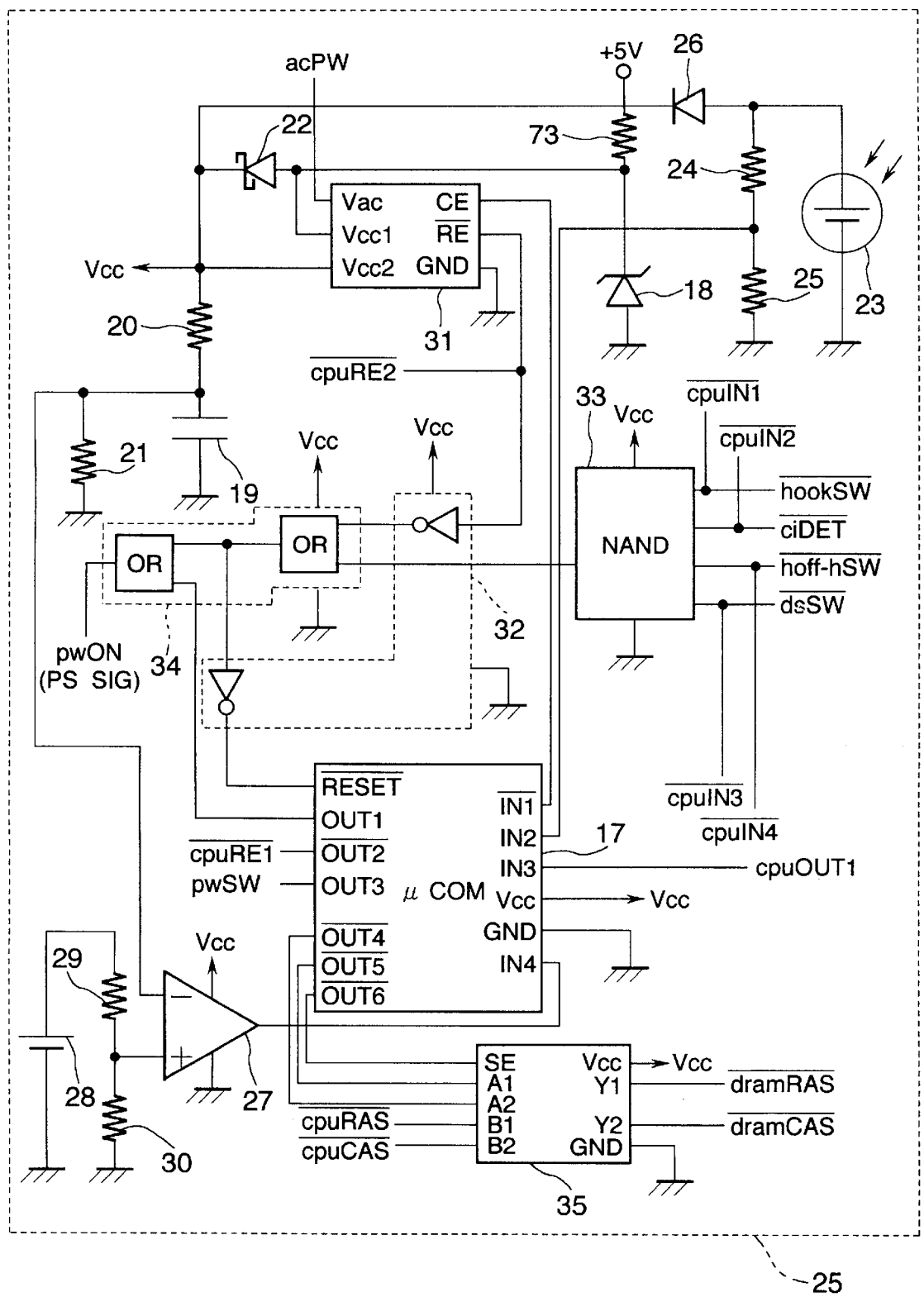
FIG. 2 shows a circuit diagram of a configuration of a main power supply control unit.
Figure 3:
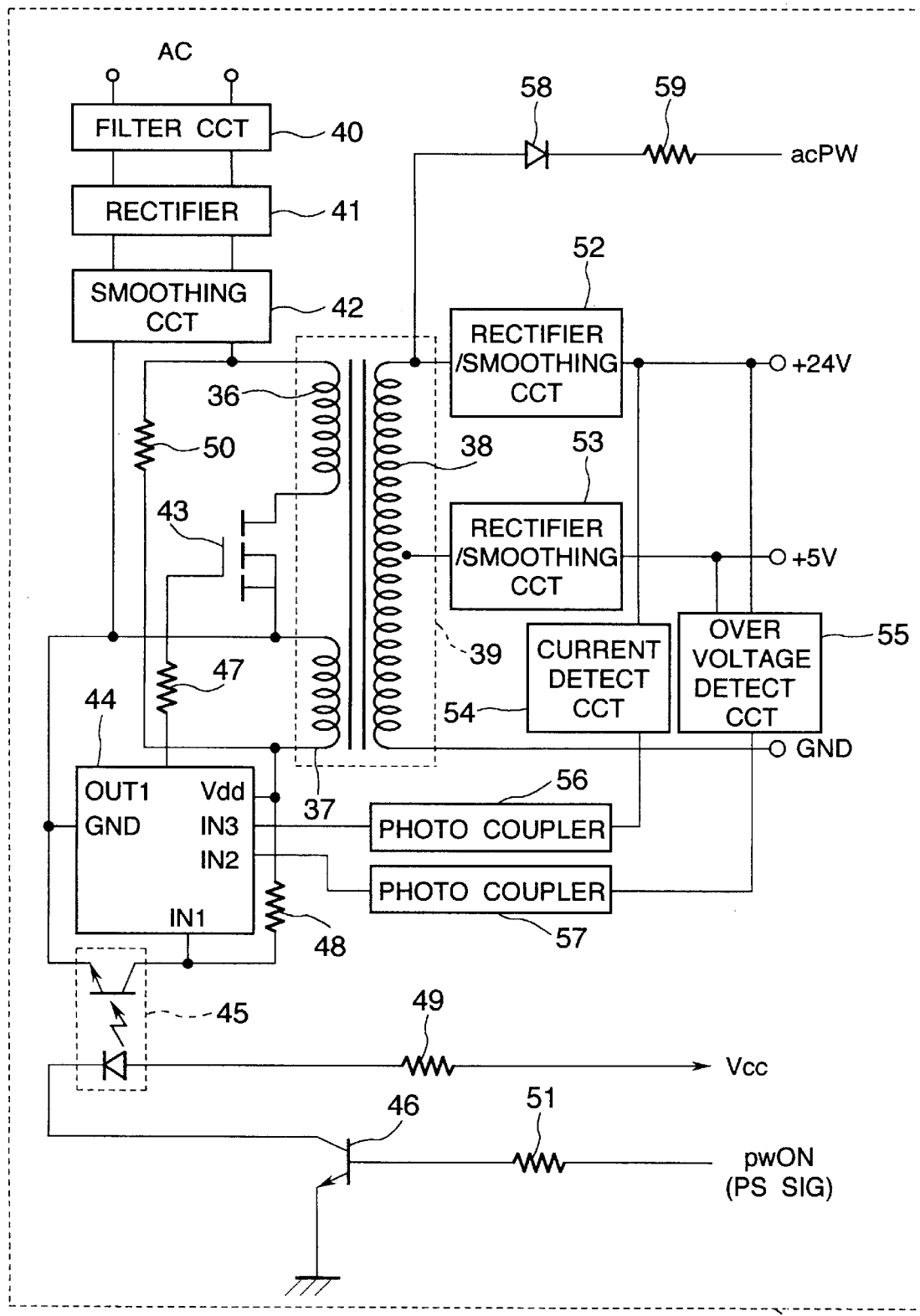
FIG. 3 shows a circuit diagram of a configuration of a main power supply.
Figure 4A:
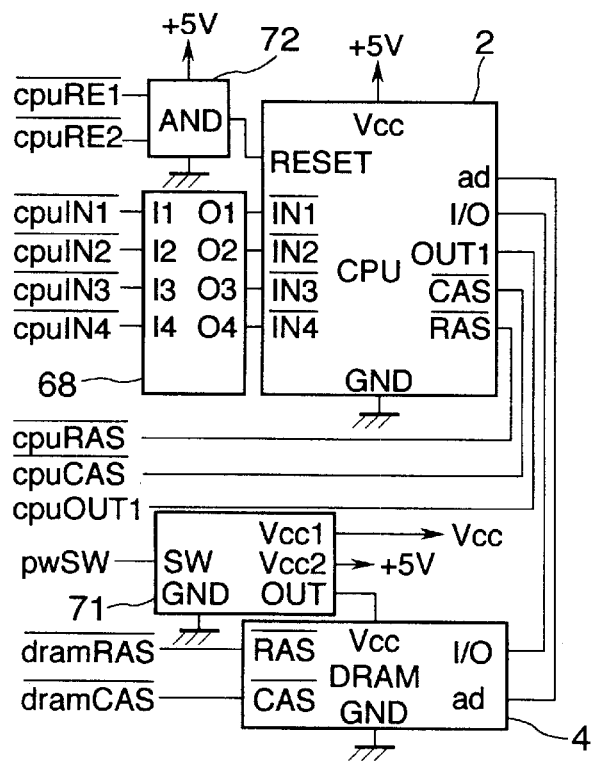
FIGS. 4A to 4C show configurations of unit of FIG. 1.
Figure 4B:
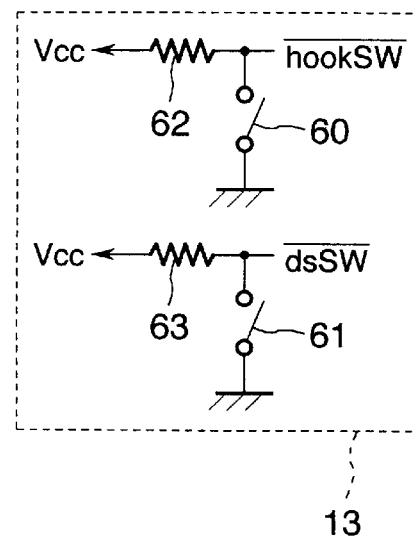
Figure 4C:
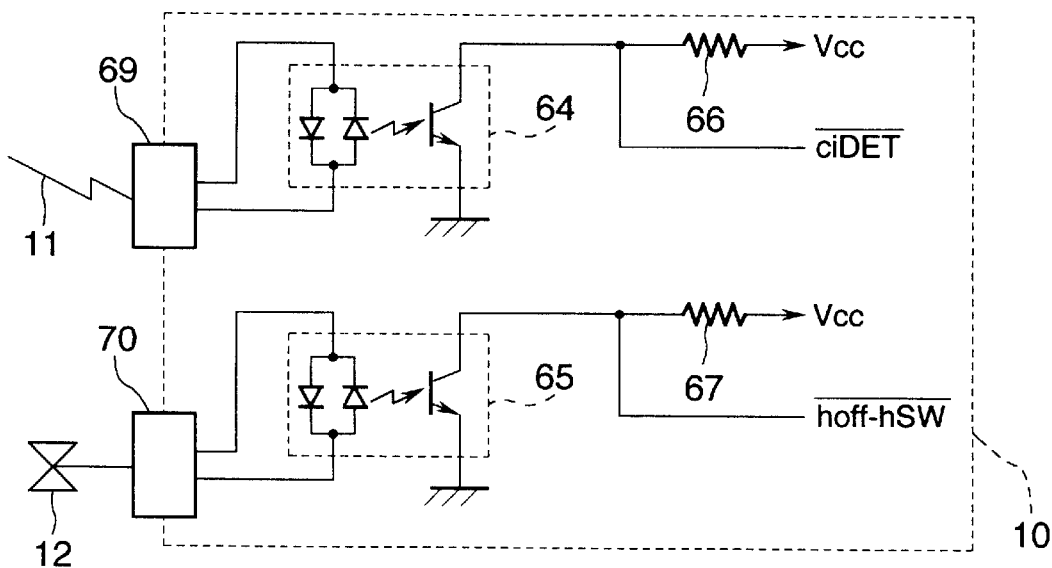

FIG. 2 shows a circuit diagram of a configuration of the main power supply control unit 15, FIG. 3 shows a circuit diagram of a configuration of the main power supply 16, and FIGS. 4A to 4C show circuit configurations of switches in the apparatus 1 and peripheral circuits of the CPU 2 and the DRAM 4.

In these figures, a power supply line Vcc connects three channels of power supplies, first being a 5V line from the main power supply 16, second being a solar cell 23 and third being the capacitor type secondary battery 19. Priorities of those three power supplies are determined by respective voltages, charging of the secondary battery 19, a back current prevention shottoky barrier diode 22 and a back current prevention diode 26. A voltage from the main power supply 16 is set to 4.8V by a zener diode 18 and the barrier diode 22, a voltage from the solar cell 23 is set to 4.6V, and a voltage from the secondary battery 19 is set to 4.5V (in a fully charged condition).

By the polarities of the diodes 22 and 26, the power supply by the main power supply 16 has a highest priority when the main power supply 16 is activated, and it charges the secondary battery 19 and supplies power to the line Vcc. At this time, the solar cell 23 is at a low level and no current flows from the solar cell 23. When the main power supply 16 is not in operation and the solar cell 23 supplies power, that is, when the main power supply 16 does not operate but a light energy is supplied, the secondary battery 19 supplies power to the line Vcc if the secondary battery 19 is of higher level than the solar cell 23, and power is not supplied from the solar cell 23. When the secondary battery 19 is lower than the solar cell 23, power is supplied from the solar cell 23 to the line Vcc and the secondary battery 19 is charged through a resistor 20. When the main power supply 16 is not operated and the solar cell 23 does not supply power, power is supplied from the secondary battery 19 to the line Vcc.

In FIG. 2, numeral 17 denotes a 4-bit one chip microcomputer which is operable with an extremely low power consumption and has built-in timer means. Whether the solar cell 23 supplies power or not is detected by dividing the voltage thereof by resistors 24 and 25 and supplying it to an input port IN2 of the microcomputer 17. The voltage of the secondary battery 19 is detected by comparing it with the voltage of a primary battery 28 for backing up the RAM 5 by a comparator 27 through a voltage stabilizing resistor 21. An output of the comparator 27 is supplied to an input port IN4 of the microcomputer 17 which is the voltage detection means. Numerals 29 and 30 denote resistors for dividing the voltage of the primary battery 28.

Numeral 31 denotes an IC for comparing the secondary voltage Vac of the main power supply 16, the voltage Vcc1 of +5V from the main power supply 16 and the voltage Vcc2 of the secondary battery 19. When Vcc1 is higher than 2V, the output port CE is at a high level, and when Vac is equal to or lower than approximately 2V, the output port CE is at a low level. This output is supplied to the input port IN1 of the microcomputer 17. When Vcc2 is equal to or lower than 3V, the output port RE changes from the high level to the low level and a reset signal is continuously outputted, and when Vcc2 is higher than 3V, the output port RE maintains the high level. This output is supplied to a RESET port of the microcomputer 17 and the main power supply 16 through an inverter IC 32 and an OR gate IC 34. This output is also supplied to a RESET port of the CPU 2 through an AND gate IC 72 of FIGS. 4A to 4C.

Numeral 33 denotes a NAND gate IC to which a signal from a hooking switch 60 of FIGS. 4A to 4C, a mechanical document sheet detection switch (or a reed switch) 61, a call signal detection switch (photo-coupler) 64 or a hand set off-hook detection switch (photo-coupler) 65 is applied. An output of the IC 33 is supplied to the RESET port of the microcomputer 17 and the main power supply 16 through the IC 34. In FIGS. 4A to 4C, numerals 62, 63, 66 and 67 denote voltage regulating resistors, and numerals 69 and 70 denote modular jacks.

Numeral 35 denotes a 2-input 2-channel multiplexer which selects the CPU 2 or the microcomputer 17 to control the DRAM 4. When the output signal at the port OUT6 of the microcomputer 17 is at the low level, the port SE of the multiplexer 35 is at the low level and the inputs at the input ports B1 and B2 of the multiplexer 35 are outputted from the output ports Y1 and Y2, respectively. When the output signal from the port OUT6 of the microcomputer 17 is at the high level, the port SE of the multiplexer 35 is at the high level and the inputs at the input ports A1 and A2 are outputted from the output ports Y1 and Y2, respectively. A RAS signal from the port OUT5 of the microcomputer 17 and a CAS signal from the port OUT4 are supplied to the DRAM 4 through the multiplexer 35.

When the input port IN3 of the microcomputer 17 is at the high level, it represents that the CPU 2 is in operation. The output of the output port OUT1 of the microcomputer 17 is supplied to the main power supply 16 through the IC 34. A reset signal is outputted from the output port OUT2 of the microcomputer 17 to the CPU 2 through the AND gate 72. Numeral 73 denotes a voltage regulating resistor.

In FIG. 3, an AC input is supplied to a primary and secondary insulation transformer 39 through a filter circuit 40, a rectifier circuit 41 and a smoothing circuit 42, and switched by a FET 43. Numeral 36 denotes a primary winding, numeral 38 denotes a secondary winding, numeral 44 denotes and IC for controlling the oscillation of the primary circuit of the transformer 39. A power supply Vdd therefor is supplied by an auxiliary winding 37 wound on the transformer 39. The secondary circuit of the transformer 39 supplies voltages of +24V and +5V to the units of the apparatus 1 from the winding 38 through rectifier-smoothing circuits 52 and 53.

Numeral 54 denotes a current detection circuit and numeral 55 denotes an over voltage detection circuit. The outputs therefrom are fed back to the IC 44 through photo-couplers 56 and 57, respectively. The IC 44 conducts the PWM control by the secondary current and when it detects the overvoltage, it shuts down the entire system.

A PS signal which is unique to the present embodiment is supplied to the IC 44 through a photo-coupler 45 so that when the PS signal is at a high level, the transistor 46 is turned on and a current flows through the photo-coupler 45. The photo-coupler 45 conducts the current-to-voltage conversion so that the input port IN1 of the IC 44 is rendered low level and the output port OUT1 of the IC 44 oscillates and the primary circuit of the transformer 39 oscillates through the FET 43 to supply a power to the secondary circuit. Thus, the main power supply 16 rises and starts the operation. When the PS signal is at a low level, the transistor 46 is turned off and the input port IN1 of the IC 44 is rendered high level so that the output port OUT1 of the IC 44 is rendered low level to turn off the FET 43. Thus, the oscillation of the primary circuit of the transformer is stopped to stop the operation of the main power supply 16. Numerals 47, 48, 49, 50 and 51 denote current limiting resistors, numeral 58 denotes a back-circuit preventing diode and numeral 59 denotes a current limiting resistor. The photo-coupler also serves to isolate the primary circuit and the secondary circuit.

FIGS. 4A to 4C show circuit configurations of respective parts of FIG. 1. FIG. 4A shows a periphery of the CPU 2 and the DRAM 4, FIG. 4B shows a console unit 13, and FIG. 4C shows a network control unit 10. In FIGS. 4A to 4C, numeral 68 denotes a delay circuit comprising a resistor and a capacitor which delays a signal applied to I4 from I1 by a time required to initialize the CPU 2 and outputs it from ports 01 to 04.

Numeral 71 denotes a switching circuit for selecting Vcc or +5V from the main power supply as a power to be supplied to the DRAM 4 and it comprises an FET. When an input port SW of the switching circuit 71 is at a low level, the power is supplied from Vcc, and when it is at a high level, the power is supplied from +5V. The control is effected by an output from an output port OUT3 of the microcomputer 17. In the stand-by mode, the power is supplied from Vcc and the supply of power from +5V of the main power supply to the DRAM 4 is inhibited. When the main power supply rises, the power is supplied from +5V of the main power supply.

FIGS. 5, 6, 7, and 8 show flow charts of the operation of the present embodiment. The operation is now explained with reference to those drawings.

Figure 5:
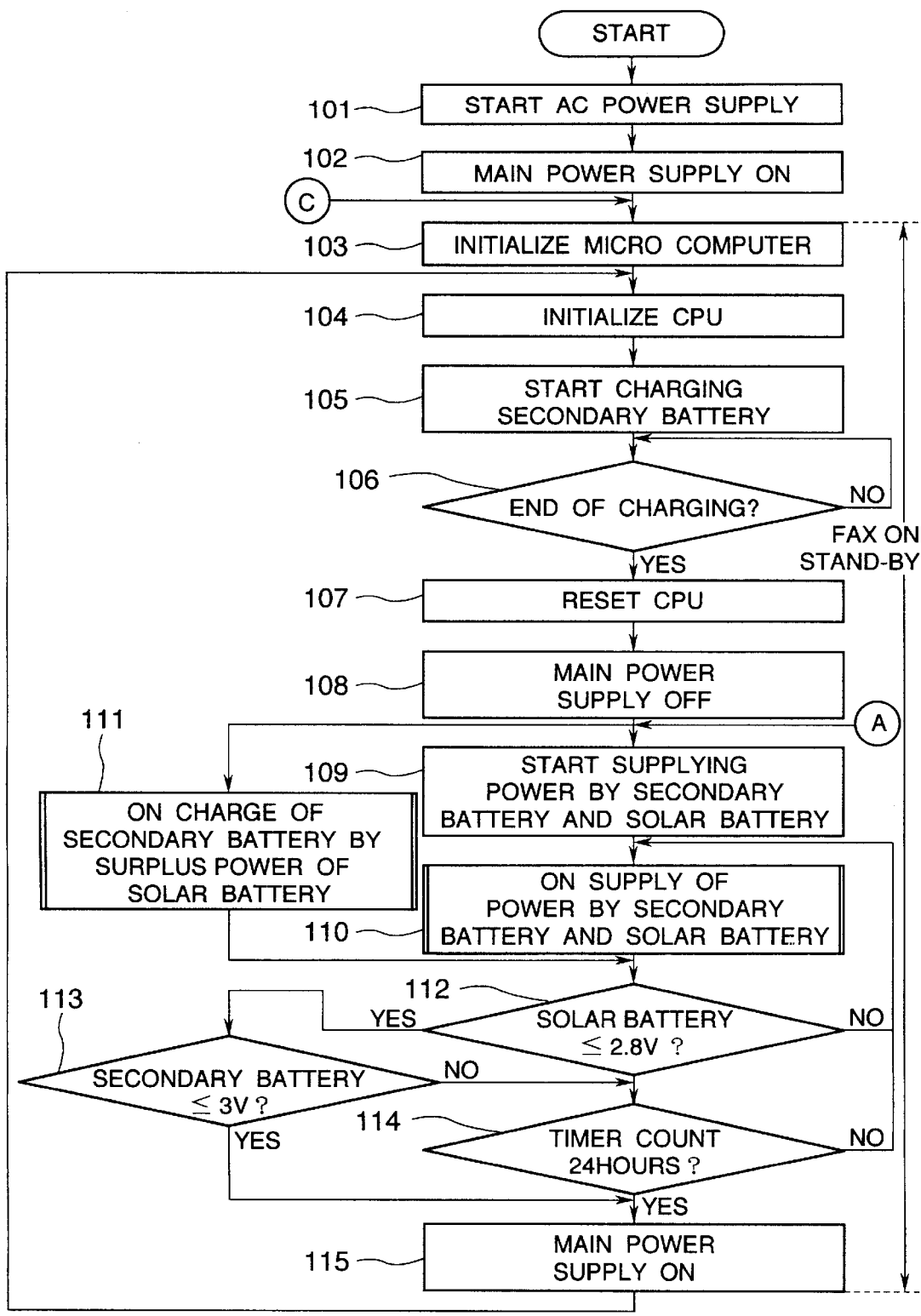
FIG. 5 shows a flow chart illustrating an operation in a stand-by mode.

FIG. 5 shows a flow of operation in a facsimile stand-by mode. When an AC input starts (step 101), the main power supply 16 is turned on the rises (step 102) to initialize the microcomputer 17 (step 103), initialize the CPU 2 (step 104) and start the charging of the secondary battery 19 (step 105). When the initialization of the microcomputer 17 is completed, the facsimile is in the stand-by mode and the secondary battery 19 is continuously charged so long as the stand-by mode lasts.

When the charging of the secondary battery 19 is completed (step 106), that is, when the output of the comparator 27 becomes high level, or when a timer built in the microcomputer 17 has timed one hour, the main power supply 16 is stopped. In the former case, the port IN4 of the microcomputer 17 is at the high level so that the microcomputer 17 resets the CPU 2 (step 107) and stops the operation of the main power supply (step 108) to start the supply of power by only the secondary battery 19 and the solar cell 23 (step 109). In the latter case, the microcomputer 17 resets the CPU 2 and the operation of the main power supply 16 is stopped and the supply of power is conducted by only the secondary battery 19 and the solar cell 23 (step 110). In any case, the secondary battery is charged by a rest of the power supplied by the solar cell 23 (step 111).

When the supply of power from the solar cell 23 decreases and the voltage thereof drops at 2.8V or less (step 112), the secondary battery 19 discharges. When the voltage thereof drops at 3V or less (step 113), or when 24 hours has elapsed from the stop of the operation of the main power supply 16 as counted by the timer of the microcomputer 17 (step 114), the main power supply 16 is turned on (step 115). In the former case, an RE port of the IC 31 is at the low level and the PS signal is at the high level so that the photo-coupler 45 is turned on and the port IN1 of the IC 44 is rendered low level. Thus, the port OUT1 of the IC 44 oscillates, and the primary circuit of the transformer 39 oscillates through the FET 43 to supply a power to the secondary circuit. Thus, the main power supply 16 rises. In the latter case, the port OUT1 of the microcomputer 17 changes from the low level to the high level and the PS signal is at the high level to turn on the photo-coupler 45 and render the port IN1 of the IC 44 low level. Thus, the port OUT1 of the IC 44 oscillates and the primary circuit oscillates through the FET 43 to supply a power to the secondary circuit. Thus, the main power supply 16 rises. In any case, the CPU 2 is initialized during the operation and the charging of the secondary battery 19 is started. Thus, the secondary battery 19 is recharged while the facsimile stand-by mode is maintained. This cycle is repeated.

Figure 6:
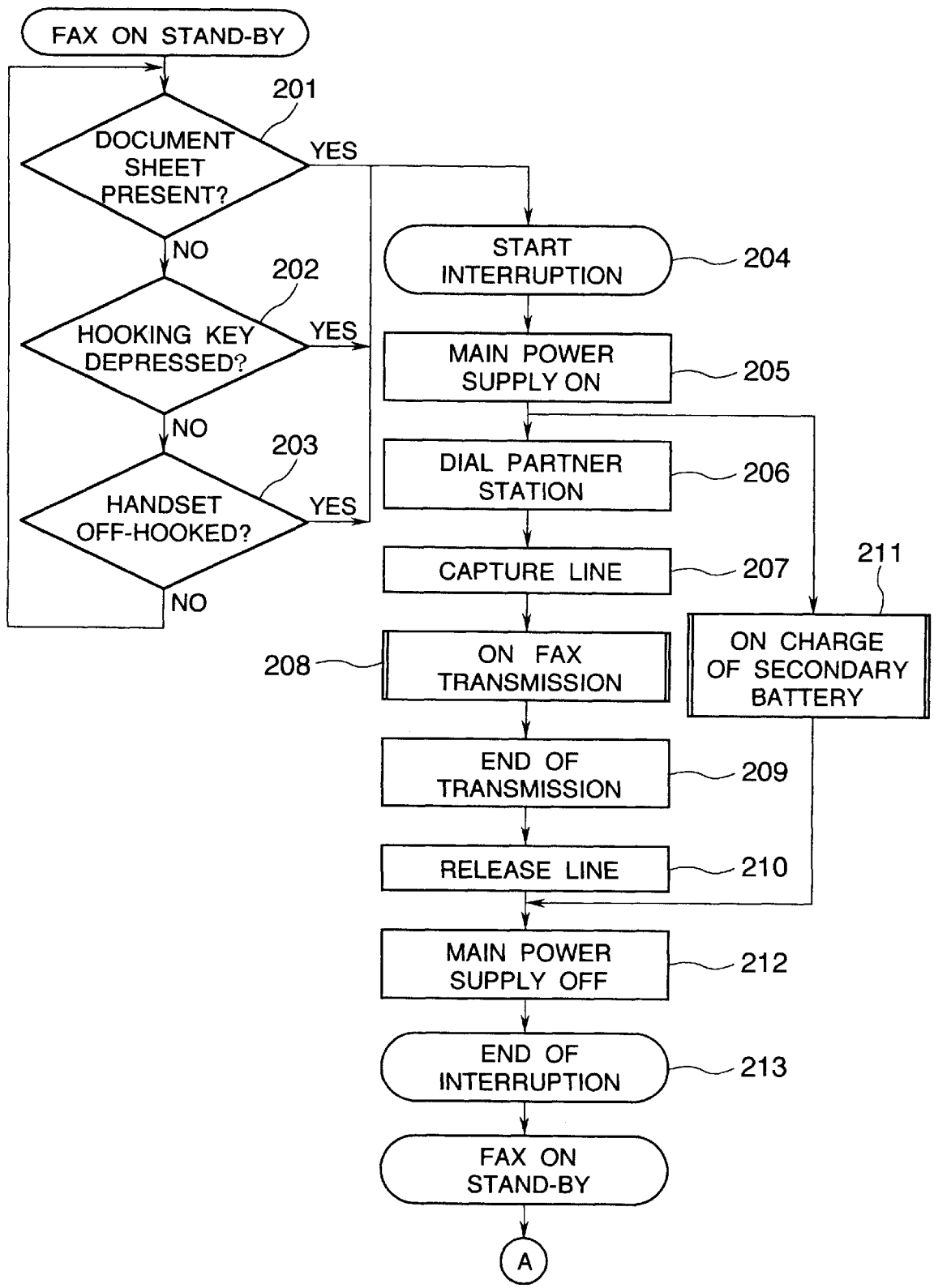
FIG. 6 shows a flow chart of an interruption routine in a transmission mode in the stand-by mode.

FIG. 6 shows an interrupt routine in the facsimile transmission in the facsimile stand-by mode. When a document sheet is present in the facsimile stand-by mode (step 201), or when a hook button is depressed (step 202), or when a hand set is hooked off (step 203), a switch 61, 60 or 65 is turned on, respectively, and the on signal is supplied to the CPU 2 through the delay circuit 68 and applied as the PS signal through the IC's 33, 32 and 34 to turn on the photo-coupler 45 to reset the microcomputer 17. Thus, the interruption operation is started (step 204).

When the photo-coupler 45 is turned on, the IC 44 causes the primary circuit to oscillate through the FET 43 to supply the power to the secondary circuit. Thus, the main power supply rises (step 205). While the main power supply 16 rises, the secondary battery 19 is continuously charged (step 211). When a call is made to a destination facsimile under this condition (step 206) and a line is captured (step 207), normal facsimile transmission is ready (step 208). When the transmission is completed (step 209) and the line is disconnected (step 210), the signal supplied from the port OUT1 of the CPU 2 to the port IN3 of the microcomputer 17 changes from the high level to the low level and the microcomputer 17 resets the CPU 2 and renders the PS signal to the low level to stop the operation of the main power supply 16 (step 212). When the interruption is over (step 213), the facsimile stand-by mode is resumed and the process returns to A of FIG. 5.

Figure 7:
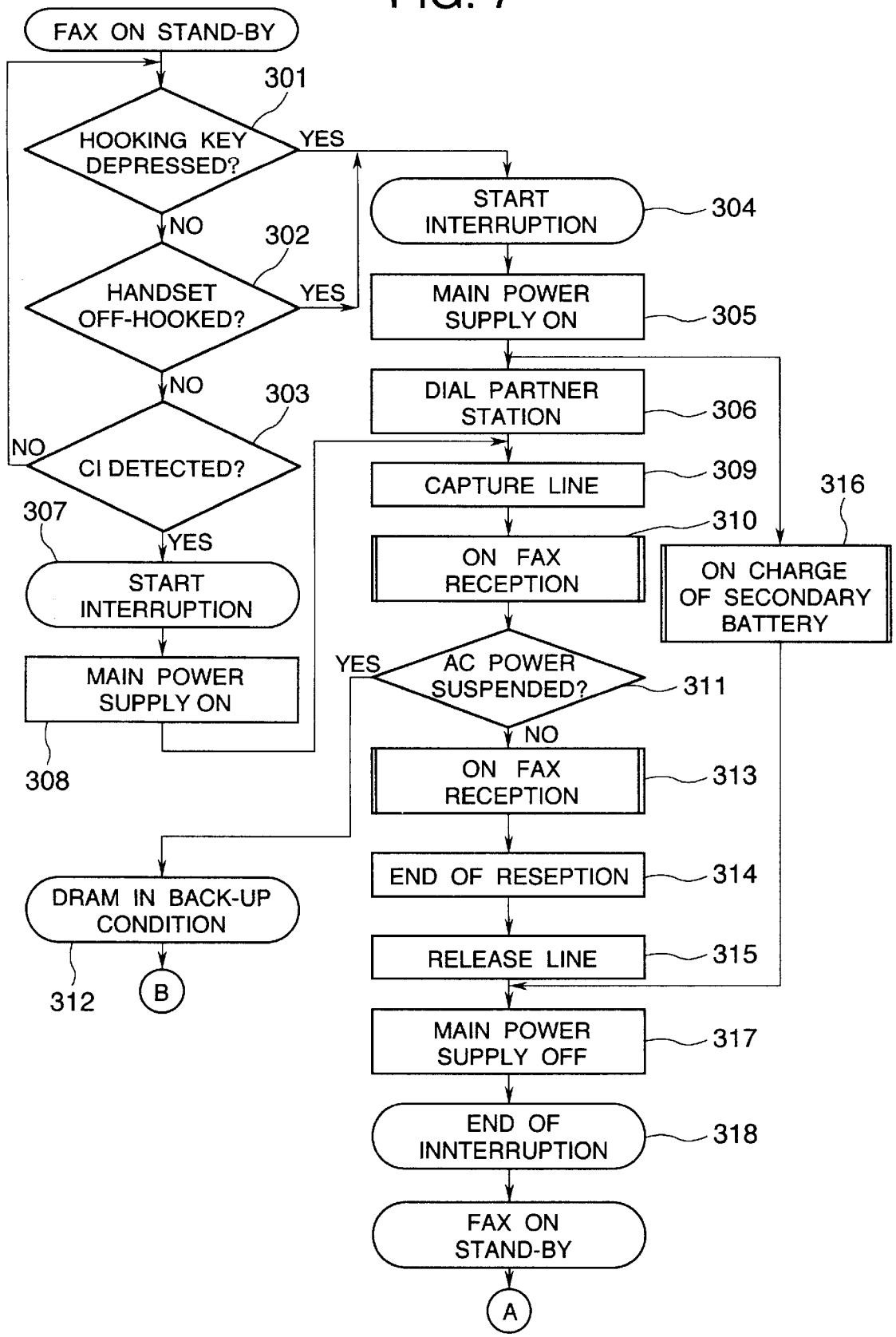
FIG. 7 shows a flow chart of an interruption routine in a reception mode in the stand-by mode.

FIG. 7 shows an interrupt routine in facsimile reception in the facsimile stand-by mode. When the hook button is depressed in the facsimile stand-by mode (step 301) or the hand set is hooked off (step 302), the switch 60 or 65 is turned on and the on signal is supplied to the CPU 2 through the delay circuit 68 and applied as the PS signal through the IC's 33, 32 and 34 to turn on the photo-coupler 45 and reset the microcomputer 17. Thus, the interruption operation is started (step 304).

When the photo-coupler 45 is turned on, the IC 44 causes the primary circuit to oscillate through the FET 43 to supply the power to the secondary circuit. Thus, the primary power supply 16 rises (step 305). When a call signal (CI) is detected (step 303), the switch 64 is turned on and the on signal is supplied to the CPU 2 through the delay circuit 68 and applied as the PS signal through the IC's 33, 32 and 34 to turn on the photo-coupler 45 and reset the microcomputer 17. Thus, the interruption operation is started (step 307). When the photo-coupler 45 is turned on, the IC 44 causes the primary circuit to oscillate through the FET 43 to supply the power to the secondary circuit. Thus, the main power supply 16 rises (step 308). In any case, while the main power supply rises, the secondary battery 19 is continuously charged (step 316).

When the hook button is depressed or when the hand set is hooked off, a call is made to a destination facsimile (step 306), and when a line is captured (step 309), normal ff reception is conducted (step 310). When a call signal is detected, the network control unit 10 captures the line and the facsimile reception is conducted in an automatic receive mode.

Figure 8:
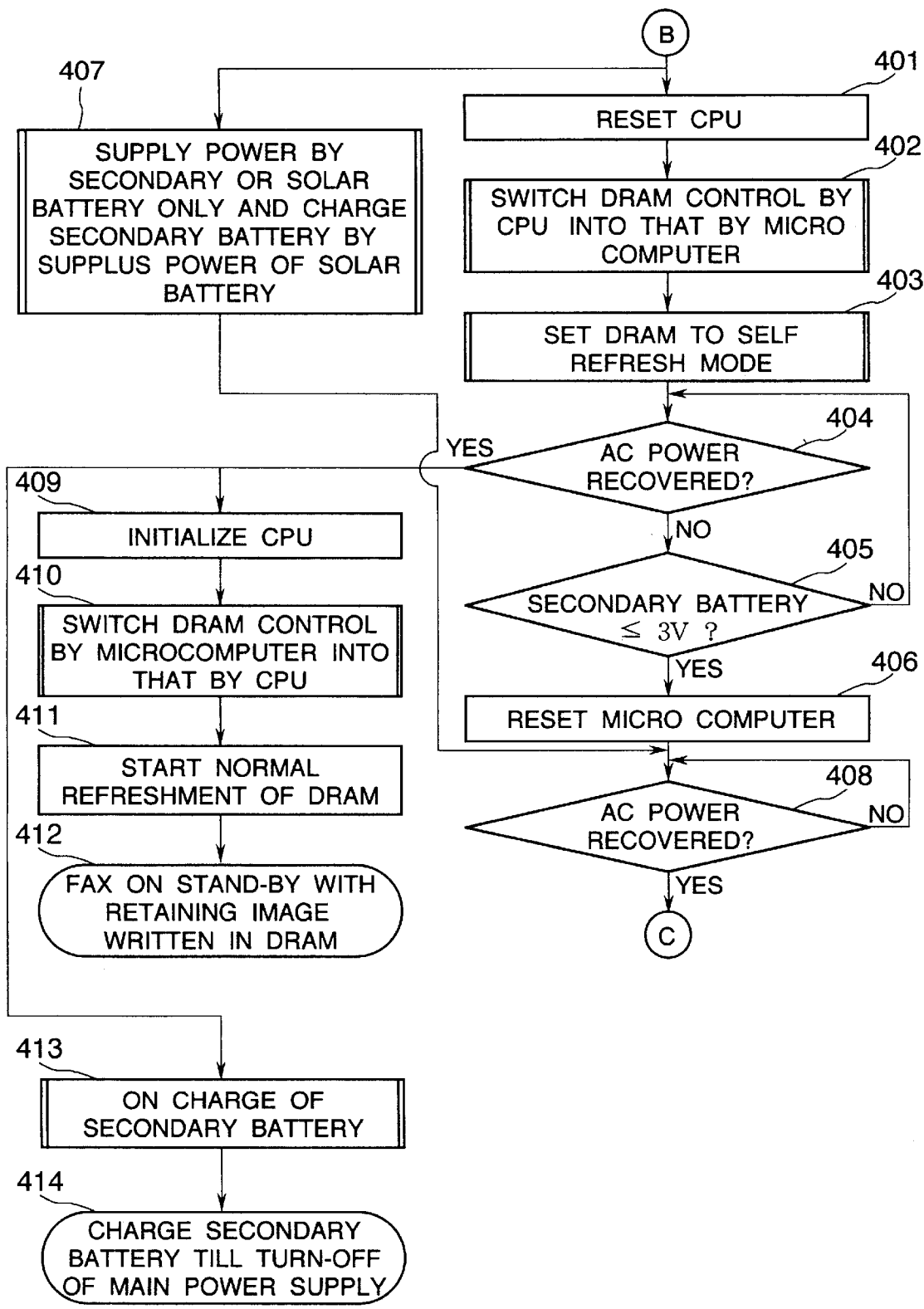
FIG. 8 shows a flow chart of an interruption routine in a backup mode.

When the AC input to the main power supply 16 suddenly ceases by power failure or other reason (step 311) during the facsimile reception (steps 310 and 313), a DRAM back-up state starts as shown in FIG. 8. However, when the AC input is normally supplied to the main power supply 16 and the reception is completed (step 314) and the line is disconnected (step 315), the signal supplied from the port OUT1 of the CPU 2 to the port IN3 of the microcomputer 17 changes from the high level to the low level and the microcomputer 17 resets the CPU 2 and renders the PS signal to the low level to stop the operation of the main power supply 16 (step 317). When the interruption operation is completed (step 318) the facsimile stand-by mode is resumed and the process returns to A of FIG. 5.

FIG. 8 shows an interrupt routine in the DRAM back-up mode. In FIG. 7, when the AC input to the main power supply 16 suddenly ceases, Vac of the IC 31 drops at the approximately 2V or less and the output of CE is at the low level so that the microcomputer 17 reset the CPU 2 (step 401). Thus, the port OUT6 of the microcomputer 17 changes from the low level to the high level and the control of the DRAM 4 is switched from the CPU 2 to the microcomputer 17 (step 402). The microcomputer 17 immediately applies the RAS or CAS signal to the DRAM 4 at a certain timing to render the DRAM 4 to a self-refresh mode (step 403). In this mode, the DRAM 4 self-refreshes to retain the stored data. The supply of power is conducted by the secondary battery 19 or the solar cell 23 and the secondary cell 19 is charged by the rest of power supplied from the solar cell 23 (step 407).

In the above condition, when the AC input to the main power supply 16 recovers (the power failure is released) (step 404), Vcc1 of the IC 31 rises above 2V and the output of the CE is at the high level and the port IN1 of the microcomputer 17 is at the high level. Thus, the microcomputer 17 issues a reset signal to the CPU 2 and initializes the CPU 2 (step 409). Then, the port OUT6 of the microcomputer 17 assumes the low level, that is, SE of the multiplexer 35 assumes the low level to switch the control of the DRAM 4 from the microcomputer 17 to the CPU 2 (step 410) and the CPU 2 starts the normal refreshing of the DRAM 4 (step 411). Further, the facsimile stand-by mode is maintained while the data stored in the DRAM 4 is retained (step 412).

While the main power supply 16 rises, the secondary battery 19 is continuously charged (steps 413 and 414). However, when the AC input to the main power supply 16 ceases and the supply of power from the solar cell 23 also decreases and the voltage of the secondary battery 19 drops at 3V or less (step 405). RE of the IC 31 assumes the low level and the microcomputer 17 is reset (step 406). The data stored in the DRAM 4 is not retained at this time. Thereafter, when the AC input to the main power supply recovers (step 408), the process returns to C of FIG. 5 and the facsimile stand-by mode is assumed in accordance with the flow of FIG. 5.

The operations of the respective units of the present embodiment have thus been described. In the present embodiment, the main power supply control unit 15 for controlling the energization to the respective units of the apparatus 1, the main power supply 16 for supplying the power to the main power supply control unit 15, the secondary battery 19 and the solar cell 23 as required are provided to control the supply of power. Thus, the power consumption in the stand-by mode is substantially 0 watts.

Accordingly, day-long power consumption for the automatic reception function is prevented, the power loss is reduced and the generation of the radiation noise is prevented. Since the primary circuit of the power supply 16 is not directly controlled by the means, there is no restriction to the safety regulation and the implementation is facilitated.

Further, the secondary battery 19 for backing up in the power failure and the charging circuit therefor may be shared by those for the main power supply control unit 15, the number of parts required is reduced and the circuit board may be of small size and a long back-up time is attained with a low cost.

In accordance with the present invention, the main power supply for supplying the power to the respective units of the apparatus, the main power supply control unit for controlling the main power supply, the secondary battery or the solar cell for supplying the power to the main power supply control unit and the memory unit for storing the data are provided, and the main power supply is started by the call signal from the telephone line or the on signal from the switching means. Accordingly, the following effects are attained:

(1) The power consumption in the stand-by mode is substantially 0 watt and the power consumption of all day long for the automatic reception function is prevented and the power loss is significantly reduced.

(2) The generation of the radiation noise is prevented due to (1) above; so the adverse affect to other electronic equipments is eliminated.

(3) Since the primary circuit of the main power supply is not directly controlled by the means, there is no restriction to the safety regulation and the implementation is facilitated.

(4) The secondary battery for the back-up and the charging circuit therefor may be shared by those for the main power supply control unit and the number of parts required is reduced.

(5) The circuit board is of small size due to (4) above.

(6) Since the memory unit is controlled by the main power supply control unit in the back-up mode, the central control unit (CPU) need not be energized by the secondary battery and the capacity of the secondary battery may be small and a longer back-up time is attained.

(7) The secondary battery back up the supply of the power to the memory unit only in the back-up mode and the main power supply supplies the power in other modes so that the capacity of the secondary battery may be small and a longer back-up time by the secondary battery is attained in the stand-by mode.

(8) The cost is reduced due to (4),(5),(6) and (7) above.

What is claimed is:

1. A communication apparatus comprising:
   a main power supply for supplying a power to respective units of the apparatus;
   a central control unit powered from said main power supply for controlling the entire apparatus;
   a rewritable data memory unit;
   a main power supply control unit for controlling an operation of said main power supply;
   a secondary battery charged by said main power supply for supplying a power to said main power supply control unit and said memory unit; and
   means for supplying the power from said secondary battery to said memory unit during the stop of said main power supply and supplying the power from said main power supply to said memory unit during the operation of said main power supply,
   wherein said main power supply control unit includes timer means and starts said main power supply when the power is not supplied from said main power supply for a predetermined time period and causes said main power supply to supply the power to said main power supply control unit and said secondary battery to start a stand-by charge mode.

2. A communication apparatus according to claim 1 further comprising a solar cell for charging said secondary battery and supplying the power to said memory unit during the stop of said main power supply.

3. A communication apparatus according to claim 2 wherein a power supply to supply the power to said memory unit is any one of said main power supply, said secondary battery and said solar cell, and said main power supply, said secondary battery and said solar cell are switched such that the power is supplied to said memory unit from said secondary battery or said solar cell during the stop of said main power supply, and the power is supplied to said memory unit from said main power supply during the operation of said main power supply.

4. A communication apparatus according to claim 2 wherein the power is supplied to said main power supply control unit in the priority order of from said main power supply, said solar cell and said secondary battery.

5. A communication apparatus according to claim 2 wherein said secondary battery is charged by the rest of the power supplied from said solar cell.

6. A communication apparatus according to claim 1 or 2 further comprising switching means, wherein said main power supply control unit starts said main power supply by an on signal from said switching means.

7. A communication apparatus according to claim 6 wherein said switching means comprises a document sheet detection switch, a switch for starting the operation of a transmission start key or an off-hook detection switch of hand set.

8. A communication apparatus according to claim 7 wherein said switching means comprises a mechanical switch or a reed switch.

9. A communication apparatus according to claim 1 or 2 further comprising call signal detection means for detecting a call signal from a telephone line, wherein said main power supply control unit starts said main power supply by the detection of the call signal by said call signal detection means.

10. A communication apparatus according to claim 1 or 2 further comprising switching means and call signal detection means for detecting a call signal from a telephone line, wherein said main power supply control unit starts said main power supply by an on signal from said switching means or a call detection signal from said call signal detection means.

11. A communication apparatus according to claim 10 wherein said main power supply control unit and said central control unit receive the on signal of said switching means and the call detection signal of said call signal detection means, and said main power supply control unit forcibly stops said main power supply when said central control unit issues a stop command.

12. A communication apparatus according to claim 1 or 2 wherein said main power supply control unit includes voltage detection means for detecting a voltage of said secondary battery, and starts said main power supply when the detected voltage drops below a predetermined threshold to cause said main power supply to supply the power to said main power supply control unit and said secondary battery and start a stand-by charge mode.

13. A communication apparatus according to claim 12 wherein the operation of said main power supply is stopped when a voltage of said secondary battery rises above a threshold in the stand-by charge mode.

14. A communication apparatus according to claim 1 or 2 further comprising power failure detection means for detecting the stop of the power from said main power supply, wherein said main power supply control unit switches control of refreshing of said memory unit from said central control unit to said main power supply control unit when the power failure is detected by said power failure detection means.

15. A communication apparatus according to claim 1 or 2 further comprising energization detection means for detecting the energization to said main power supply, wherein said main power supply control unit starts said main power supply and switches control of refreshing of said memory unit from said main power supply control unit to said central control unit and causes said main power supply to supply the power to said memory unit when said energization detection means detects the energization.

16. A communication apparatus according to claim 1 or 2 further comprising detection means for detecting the energization to said main power supply and detecting the stop of the energization of said main power supply, wherein said main power supply control unit switches control of refreshing of said memory unit from said central control unit to said main power supply control unit when said detection means detects the stop of the energization, and starts said main power supply and switches the control of said memory unit from said main power supply control unit to said central control unit and causes said main power supply to supply the power to said memory unit when said detection means detects the energization.

17. A communication apparatus according to claim 1 or 2 wherein said main power supply control unit includes timer means and stops the operation of said main power supply when a unit other than said main power supply does not operate for a predetermined time period.

18. A communication apparatus according to claim 1 or 2 wherein said main power supply charges said secondary battery during the operation.

19. A communication apparatus according to claim 1 or 2 wherein said main power supply comprises a switching power supply and the switching is externally controllable.

20. A communication apparatus according to claim 1 or 2 wherein said main power supply control unit controls refreshing of said memory unit during the stop of said main power supply.

21. A communication apparatus according to claim 1 or 2 wherein said main power supply control unit controls refreshing of said memory unit during the stop of said main power supply, and said central controls said memory unit during the operation of said main power supply.

22. A communication apparatus according to claim 1 or 2 wherein a power supply to supply the power to said memory unit is either one of said main power supply and said secondary battery, and said main power supply and said secondary battery are switched such that the power is supplied to said memory unit from said secondary battery during the stop of said main power supply, and the power is supplied to said memory unit from said main power supply during the operation of said main power supply.

23. A communication apparatus comprising:
a main power supply for supplying a power to respective units of the apparatus;
a central control unit powered from said main power supply for controlling the entire apparatus;
a rewritable data memory unit;
a main power supply control unit for controlling an operation of said main power supply;
a secondary battery charged by said main power supply for supplying a power to said main power supply control unit and said memory unit;
means for supplying the power from said secondary battery to said memory unit during the stop of said main power supply and supplying the power from said main power supply to said memory unit during the operation of said main power supply; and
a solar cell for charging said secondary battery and supplying the power to said memory unit during the stop of said main power supply,
wherein said main power supply control unit includes timer means and starts said main power supply when the power is not supplied from said main power supply for a predetermined time period and causes said main power supply to supply the power to said main power supply control unit and said secondary battery to start a stand-by charge mode.

24. A communication apparatus according to claim 1 or 23 wherein the operation of said main power supply is stopped when said main power supply does not supply the power for a predetermined time period in the stand-by charge mode.

25. A communication apparatus comprising:
a main power supply for supplying a power to respective units of the apparatus;
a central control unit powered from said main power supply for controlling the entire apparatus;
a rewritable data memory unit;
a main power supply control unit for controlling an operation of said main power supply;
a secondary battery charged by said main power supply for supplying a power to said main power supply control unit and said memory unit; and
means for supplying the power from said secondary battery to said memory unit during the stop of said main power supply and supplying the power from said main power supply to said memory unit during the operation of said main power supply,
wherein said main power supply control unit includes voltage detection means for detecting a voltage of said secondary battery and timer means and starts said main power supply when the voltage of said secondary voltage drops below a predetermined threshold or the power is not supplied from said main power supply for a predetermined time period and causes said main power supply to supply the power to said main power supply control unit and said secondary battery to start a stand-by charge mode.

26. A communication apparatus comprising:
a main power supply for supplying a power to respective units of the apparatus;
a central control unit powered from said main power supply for controlling the entire apparatus;
a rewritable data memory unit;
a main power supply control unit for controlling an operation of said main power supply;
a secondary battery charged by said main power supply for supplying a power to said main power supply control unit and said memory unit; and
means for supplying the power from said secondary battery to said memory unit during the stop of said main power supply and supplying the power from said main power supply to said memory unit during the operation of said main power supply,
wherein said main power supply control unit includes voltage detection means for detecting a voltage of said secondary battery and timer means and starts said main power supply when the voltage of said secondary voltage drops below a predetermined threshold or the power is not supplied from said main power supply for a predetermined time period and causes said main power supply to supply the power to said main power supply control unit and said secondary battery to start a stand-by change mode and,
wherein the operation of said main power supply is stopped when a voltage of said secondary battery rises above a threshold in the stand-by charge mode or when said main power supply does not supply the power for a predetermined time period in the stand-by charge mode.

27. A communication apparatus comprising:
a main power supply for supplying a power to respective units of the apparatus;
a central control unit powered from said main power supply for controlling the entire apparatus;
a rewritable data memory unit;
a main power supply control unit for controlling an operation of said main power supply;
a secondary battery charged by said main power supply for supplying a power to said main power supply control unit and said memory unit;
means for supplying the power from said secondary battery to said memory unit during the stop of said main power supply and supplying the power from said main power supply to said memory unit during the operation of said main power supply; and
energization detection means for detecting the energization to said main power supply, wherein said main power supply control unit starts said main power supply and switches the control of said memory unit from said main power supply control unit to said central control unit and causes said main power supply to supply the power to said memory unit when said energization detection means detects the energization, wherein said main power supply control unit includes voltage detection means for detecting a voltage of said secondary battery, and the operation of said main power supply is stopped when a voltage of said secondary battery rises above a threshold in a main power supply back-up mode in which said main power supply operates and backs up the data stored in said memory unit.

28. A communication apparatus comprising;
a main power supply for supplying a power to respective units of the apparatus;
a central control unit powered from said main power supply for controlling the entire apparatus;
a rewritable data memory unit;
a main power supply control unit for controlling an operation of said main power supply;
a secondary battery charged by said main power supply for supplying a power to said main power supply control unit and said memory unit;
means for supplying the power from said secondary battery to said memory unit during the stop of said main power supply and supplying the power from said main power supply to said memory unit during the operation of said main power supply; and
energization detection means for detecting the energization to said main power supply, wherein said main power supply control unit starts said main power supply and switches the control of said memory unit from said main power supply control unit to said central control unit and causes said main power supply to supply the power to said memory unit when said energization detection means detects the energization, wherein said main power supply control unit includes timer means, and stops the operation of said main power supply when a main power supply back-up mode in which said main power supply operates and backs up the data stored in said memory means lasts for a predetermined time period.

29. A communication apparatus comprising:
a main power supply for supplying a power to respective units of the apparatus;
a central control unit powered from said main power supply for controlling the entire apparatus;
a rewritable data memory unit;
a main power supply control unit for controlling an operation of said main power supply;
a secondary battery charged by said main power supply for supplying a power to said main power supply control unit and said memory unit;
means for supplying the power from said secondary battery to said memory unit during the stop of said main power supply and supplying the power from said main power supply to said memory unit during the operation of said main power supply; and
energization detection means for detecting the energization to said main power supply, wherein said main power supply control unit starts said main power supply and switches the control of said memory unit from said main power supply control unit to said central control unit and causes said main power supply to supply the power to said memory unit when said energization detection means detects the energization, wherein said main power supply control unit includes voltage detection means for detecting a voltage of said secondary battery and timer means, and stops the operation of said main power supply when the voltage of said secondary battery rises above a predetermined threshold in a main power supply back-up mode in which said main power supply operates and backs the data stored in said memory means or when the main power supply back-up mode lasts for a predetermined time period.

30. A communication apparatus comprising:
a main power supply for supplying power to respective units of the apparatus;
a central control unit, powered from said main power supply, that generates an ON/OFF instruction signal;
a rewritable data memory unit;
a main power supply control unit for turning ON and turning OFF said main power supply in response to the ON/OFF instruction signal generated by said central control unit;
a battery charged by said main power supply for supplying power to said main power supply control unit and said memory unit; and
means for selectively supplying power to said memory unit (a) from said battery in response to an OFF condition of the ON/OFF instruction signal, and (b) from said main power supply in response to an ON condition of the ON/OFF instruction signal.

31. A communication apparatus according to claim 30 further comprising a solar cell for charging said battery and supplying the power to said memory unit during the stop of said main power supply.

32. A communication apparatus according to claim 31, wherein a power supply to supply the power to said memory unit is any one of said main power supply, said battery and said solar cell, and said main power supply, said battery and said solar cell are switched such that the power is supplied to said memory unit from said battery or said solar cell during stop of said power supply, and the power is supplied to said memory unit from said main power supply during the operation of said main power supply.

33. A communication apparatus according to claim 31, wherein the power is supplied to said main power supply control unit in the priority order of from said main power supply, said solar cell and said battery.

34. A communication apparatus according to claim 31, wherein said battery is charged by the rest of the power supplied from said solar cell.

35. A communication apparatus according to claim 30 or 31 further comprising switching means, wherein said main power supply control unit starts said main power supply by an on signal from said switching means.

36. A communication apparatus according to claim 35, wherein said switching means comprises a document sheet detection switch, a switch for starting the operation of a transmission start key or an off-hook detection switch of a hand set.

37. A communication apparatus according to claim 36, wherein said switching means comprises a mechanical switch or a reed switch.

38. A communication apparatus according to claim 30 or 31 further comprising call signal detection means for detecting a call signal from a telephone line, wherein said main power supply control unit starts said main power supply by the detect ion of the call signal by said call signal detection means.

39. A communication apparatus according to claim 30 or 31 further comprising switching means and call signal detection means for detecting a call signal from a telephone line, wherein said main power supply control unit starts said main power supply by an on signal from said switching means or a call detection signal from said call signal detection mean.

40. A communication apparatus according to claim 30 or 31, wherein said main power supply control unit includes voltage detection means for detecting a voltage of said battery, and starts said main power supply when the detected voltage drops below a predetermined threshold to cause said main power supply to supply the power to said main power supply control unit and said battery and start a stand-by charge mode.

41. A communication apparatus according to claim 40, wherein the operation of said main power supply is stopped when a voltage of said battery rises above a threshold in the stand-by charge mode.

42. A communication apparatus according to claim 30 or 31, wherein said main power supply control unit includes timer means and starts said main power supply when the power is not supplied from said main power supply for a predetermined time period and causes said main power supply to supply the power to said main power supply control unit and said battery to start a stand-by charge mode.

43. A communication apparatus according to claim 30 or 31, wherein said main power supply control unit includes voltage detection means for detecting a voltage of said battery and timer means and starts said main power supply when the voltage of said battery drops below a predetermined threshold or the power is not supplied from said main power supply for a predetermined time period and causes said main power supply to supply the power to said main power supply control unit and said battery to start a stand-by charge mode.

44. A communication apparatus according to claim 43, wherein the operation of said main power supply is stopped when a voltage of said battery rises above a threshold in the stand-by charge mode or when said main power supply does not supply the power for a predetermined time period in the stand-by charge mode.

45. A communication apparatus according to claim 30 or 31 further comprising energization detection means for detecting the energization to said main power supply, wherein said main power supply control unit starts said main power supply and switches control of refreshing of said memory unit from said main power supply control unit to said central control unit and causes said main power supply to supply the power to said memory unit when said energization detection means detects the energization.

46. A communication apparatus according to claim 45, wherein said main power supply control unit includes voltage detection means for detecting a voltage of said secondary battery, and the operation of said main power supply is stopped when a voltage of said battery rises above a threshold in a main power supply back-up mode in which said main power supply operates and backs up the data stored in said memory unit.

47. A communication apparatus according to claim 45, wherein said main power supply control unit includes timer means, and stops the operation of said main power supply when a main power supply back-up mode in which said main power supply operates and backs up the data stored in said memory means lasts for a predetermined time period.

48. A communication apparatus according to claim 45, wherein said main power supply control unit includes voltage detection means for detecting a voltage of said battery and timer means, and stops the operation of said main power supply when the voltage of said battery rises above a predetermined threshold in a main power supply back-up mode in which said main power supply operates and backs the data stored in said memory means or when the main power supply back-up mode lasts for a predetermined time period.

49. A communication apparatus according to claim 30 or 31, wherein said main power supply control unit includes timer means and stops the operation of said main power supply when a unit other than said main power supply does not operate for a predetermined time period.

50. A communication apparatus according to claim 30 or 31, wherein said main power supply charges said battery during the operation.

51. A communication apparatus according to claim 30 or 31, wherein said main power supply comprises a switching power supply and the switching is externally controllable.

52. A communication apparatus according to claim 30 or 31, wherein said main power supply control unit controls refreshing of said memory unit during the stop of said main power supply.

53. A communication apparatus according to claim 30 or 31, wherein a power supply to supply the power to said memory unit is either one of said main power supply and said battery, and said main power supply and said battery are switched such that the power is supplied to said memory unit from said battery during stop of said main power supply, and the power is supplied to said memory unit from said main power supply during the operation of said main power supply.

54. A communication apparatus according to claim 30 wherein the operation of said main power supply is stopped when said main power supply does not supply the power for a predetermined time period in the stand-by charge mode.

55. An apparatus according to claim 30, further comprising a central control unit powered from said main power supply for controlling the entire apparatus, wherein said main power supply control unit turns ON/OFF in response to an ON/OFF instruction signal from said central control unit.

56. A communication apparatus according to claim 55 further comprising power failure detection means for detecting the stop of the power from said main power supply, wherein said main power supply control unit switches control of refreshing of said memory unit from said central control unit to said main power supply control unit when the power failure is detected by said power failure detection means.

57. A communication apparatus according to claim 55 further comprising detection means for detecting the energization to said main power supply and detecting the stop of the energization of said main power supply, wherein said main power supply control unit switches control of refreshing of said memory unit from said central control unit to said main power supply control unit when said detection means detects the stop of the energization, and starts said main power supply and switches the control of said memory unit from said main power supply control unit to said central control unit and causes said main power supply to supply the power to said memory unit when said detection means detects the energization.

58. A communication apparatus according to claim 55, wherein said main power supply control unit controls refreshing of said memory unit during the stop of said main power supply, and said central control unit controls said memory unit during the operation of said main power supply.

59. A communication apparatus according to claim 55, wherein said main power supply control unit and said central control unit receive the on signal of said switching means and the call detection signal of said call signal detection means, and said main power supply control unit forcibly stops said main power supply when said central control unit issues a stop command.

60. An apparatus according to claim 30, wherein said memory unit is set in a self-refresh mode during an OFF period of said main power supply.

61. A communication method operative in a communication apparatus including respective units, a main power supply, a rewritable data memory unit, a main power supply control unit and a battery, said method-comprising:
 a main power supply step of supplying power to respective units of the apparatus from the main power supply;
 a generating step of generating an ON/OFF instruction signal;
 a main power supply control step of turning ON and turning OFF said main power supply in response to the ON/OFF instruction signal generated in said generating step;
 a charging step of charging a battery by the main power supply unit, the battery supplying power to the main power supply control unit and the memory unit; and
 a supplying step of selectively supplying power to the memory unit (a) from the battery in response to an OFF condition of the ON/OFF instruction signal generated in said generating step, and (b) from the main power supply in response to an ON condition of the ON/OFF instruction signal generated in said generating step.

62. A method according to claim 61, further comprising a step of using a solar cell for charging the battery and supplying the power to the memory unit during the stop of the main power supply.

63. A method according to claim 62, wherein a power supply to supply the power to the memory unit is any one of the main power supply, the battery and the solar cell, and the main power supply, the battery and the solar cell are switched such that the power is supplied to the memory unit from the battery or the solar cell during stop of the power supply, and the power is supplied to the memory unit from the main power supply during the operation of the main power supply.

64. A method according to claim 62, wherein the power is supplied to the main power supply control unit in the priority order of from the main power supply, the solar cell and the battery.

65. A method according to claim 62, wherein the battery is charged by the rest of the power supplied from the solar cell.

66. A method according to claim 61 or 62, wherein the apparatus further includes switching means, and wherein the main power supply control unit starts the main power supply by an on signal from the switching means.

67. A method according to claim 66, wherein the switching means comprises a document sheet detection switch, a switch for starting the operation of a transmission start key or an off-hook detection switch of a hand set.

68. A method according to claim 67, wherein the switching means comprises a mechanical switch or a reed switch.

69. A method according to claim 61 or 62, further comprising a call signal detection step of detecting a call signal from a telephone line, wherein the main power supply control unit starts the main power supply by the detection of the call signal by said call signal detection step.

70. A according to claim 61 or 62, wherein the apparatus further includes switching means and call signal detection means for detecting a call signal from a telephone line, wherein the main power supply control unit starts the main power supply by an ON signal from the switching means or a call detection signal from the call signal detection means.

71. A method according to claim 61 or 62, wherein the main power supply control unit includes voltage detection means for detecting a voltage of the battery, and starts said main power supply step when the detected voltage drops below a predetermined threshold to cause the main power supply to supply the power to the main power supply control unit and the battery and start a stand-by charge mode.

72. A method according to claim 71, wherein the operation of the main power supply is stopped when a voltage of the battery rises above a threshold in the stand-by charge mode.

73. A method according to claim 61 or 62, wherein the main power supply control unit includes timer means and starts the main power supply when the power is not supplied from the main power supply for a predetermined time period and causes the main power supply to supply the power to the main power supply control unit and the battery to start a stand-by charge mode.

74. A method according to claim 61 or 62, wherein the main power supply control unit includes voltage detection means for detecting a voltage of the battery and timer means and starts the main power supply when the voltage of the battery drops below a predetermined threshold or the power is not supplied from the main power supply for a predetermined time period and causes the main power supply to supply the power to the main power supply control unit and the battery to start a stand-by charge mode.

75. A method according to claim 74, wherein the operation of the main power supply is stopped when a voltage of the battery rises above a threshold in the stand-by charge mode or when the main power supply does not supply the power for a predetermined time period in the stand-by charge mode.

76. A method according to claim 61, wherein the apparatus further includes a central control unit powered from the main power supply for controlling the entire apparatus, wherein the main power supply control unit turns ON/OFF in response to an ON/OFF instruction signal from the central control unit.

77. A method according to claim 76, wherein the apparatus further includes power failure detection means for detecting the stop of the power from the main power supply, wherein said main power supply control step switches control of refreshing of the memory unit from the central control unit to the main power supply control unit when the power failure is detected by the power failure detection means.

78. A method according to claim 76, wherein the apparatus further includes energization detection means for detecting the energization to the main power supply, wherein said main power supply control step starts the main power supply and switches control of refreshing of the memory unit from the main power supply control unit to the central control unit and causes the main power supply to supply the power to the memory unit when the energization detection means detects the energization.

79. A method according to claim 76, wherein said main power supply control step controls refreshing of the memory unit during the stop of the main power supply, and the central control unit controls the memory unit during the operation of the main power supply.

80. A method according to claim 76, wherein the main power supply control unit and the central control unit receive the on signal of the switching means and the call detection signal of the call signal detection means, and the main power supply control unit forcibly stops said main power supply step when the central control unit issues a stop command.

81. A method according to claim 61 or 62, wherein the apparatus further includes energization detection means for detecting the energization to the main power supply, wherein said main power supply control step starts the main power supply and switches control of refreshing of the memory unit from the main power supply control unit to the central control unit and causes the main power supply to supply the power to the memory unit when the energization detection means detects the energization.

82. A communication apparatus according to claim 81, wherein the main power supply control unit includes voltage detection means for detecting a voltage of the battery, and the operation of the main power supply is stopped when a voltage of the battery rises above a threshold in a main power supply back-up mode in which the power supply operates and backs up the data stored in the memory unit.

83. A method according to claim 81, wherein the main power supply control unit includes timer means, and stops the operation of the main power supply when a main power supply back-up mode in which the main power supply operates and backs up the data stored in the memory unit lasts for a predetermined time period.

84. A method according to claim 81, wherein the main power supply control unit includes voltage detection means for detecting a voltage of the battery and timer means, and stops the operation of the main power supply when the voltage of the battery rises above a predetermined threshold in a main power supply back-up mode in which the main power supply operates and backs the data stored in the memory unit or when the main power supply back-up mode lasts for a predetermined time period.

85. A method according to claim 61 or 62, wherein the main power supply control unit includes timer means and stops the operation of the main power supply when a unit other than the main power supply does not operate for a predetermined time period.

86. A method according to claim 61 or 62, wherein said main power supply step charges the battery during the operation.

87. A method according to claim 61 or 62, wherein the main power supply comprises a switching power supply and the switching is externally controllable.

88. A method according to claim 61 or 62, wherein said main power supply control step controls refreshing of the memory unit during the stop of the main power supply.

89. A method according to claim 61 or 62, wherein a power supply to supply the power to the memory unit is either one of the main power supply and the battery, and the main power supply and the battery are switched such that the power is supplied to the memory unit from the battery during stop of the main power supply, and the power is supplied to the memory unit from the main power supply during the operation of the main power supply.

90. A method according to claim 61, wherein the operation of the main power supply is stopped when the main power supply does not supply the power for a predetermined time period in the stand-by charge mode.

91. A method according to claim 61, wherein the memory unit is set in a self-refresh mode during an OFF period of the main power supply.

* * * * *

UNITED STATES PATENT AND TRADEMARK OFFICE
CERTIFICATE OF CORRECTION

PATENT NO.    : 6,018,802
DATED         : January 25, 2000
INVENTOR(S)   : KOICHI ABE ET AL.

It is certified that error appears in the above-identified patent and that said Letters Patent is hereby corrected as shown below:

ON THE TITLE PAGE:

Insert: --[*] Notice: This patent issued on a continued prosecution application filed under 37 CFR 1.53(d), and is subject to the twenty year patent term provisions of 35 U.S.C. 154(a)(2).--.

COLUMN 9:

Line 6, "affect" should read --effect--.

COLUMN 15:

Line 20, "detect ion" should read --detection--; and "mean." should read --means.--.

Signed and Sealed this

Eighth Day of May, 2001

Attest:

NICHOLAS P. GODICI

*Attesting Officer*    Acting Director of the United States Patent and Trademark Office